United States Patent
Brandt et al.

(10) Patent No.: US 7,850,210 B2
(45) Date of Patent: Dec. 14, 2010

(54) PLUG-IN COUPLING FOR FLUID SYSTEMS

(75) Inventors: Josef Brandt, Wipperfürth (DE); Volker Kaminski, Halver (DE); Rozália Bilstein, Wipperfürth (DE)

(73) Assignee: Voss Automotive GmbH, Wipperfurth (DE)

( * ) Notice: Subject to any disclaimer, the term of this patent is extended or adjusted under 35 U.S.C. 154(b) by 0 days.

(21) Appl. No.: 10/515,975

(22) PCT Filed: Aug. 13, 2003

(86) PCT No.: PCT/EP03/08972

§ 371 (c)(1),
(2), (4) Date: Nov. 23, 2004

(87) PCT Pub. No.: WO2004/016980

PCT Pub. Date: Feb. 26, 2004

(65) Prior Publication Data

US 2005/0179258 A1    Aug. 18, 2005

(30) Foreign Application Priority Data

Aug. 14, 2002   (DE)   ............................ 202 12 488 U

(51) Int. Cl.
*F16L 39/00*   (2006.01)
(52) U.S. Cl. .......................... 285/319; 285/308; 285/39
(58) Field of Classification Search ............... 285/39, 285/305, 319, 307, 308, 23, 33, 18
See application file for complete search history.

(56) References Cited

U.S. PATENT DOCUMENTS

| | | | |
|---|---|---|---|
| 4,991,882 A | * | 2/1991 | Gahwiler ..................... 285/319 |
| 5,031,189 A | | 7/1991 | Stuhler et al. |
| 5,074,601 A | * | 12/1991 | Spors et al. .................. 285/308 |
| 5,374,084 A | * | 12/1994 | Potokar ....................... 285/27 |
| 5,421,622 A | * | 6/1995 | Godeau ....................... 285/319 |
| 6,499,772 B1 | * | 12/2002 | Minemyer .................. 285/319 |

FOREIGN PATENT DOCUMENTS

| | | |
|---|---|---|
| DE | 3143015 | 6/1982 |
| DE | 8711334.1 | 10/1987 |
| EP | 0568075 A1 * | 11/1993 |

* cited by examiner

*Primary Examiner*—Aaron Dunwoody
(74) *Attorney, Agent, or Firm*—Brinks Hofer Gilson & Lione

(57) ABSTRACT

The invention relates to a plug-in coupling for fluid systems having two coupling parts connectable to one another, which each have coordinated catches for connecting them together, one of the coupling parts having an end union section, by means of which it can be plugged into the other coupling part, and one of the coupling parts having at least one end retaining section carrying its catches, by means of which section it grips over an outer peripheral contour of the other coupling part, on which the coordinated complementary catches are formed. In order to achieve a simplified means of detachment whilst ensuring ease of assembly and a highly stable connection of such a plug-in coupling, it is proposed to provide a separate release part, which in the assembled state is held on the first coupling part and/or the second coupling part and which serves for separating the locking connection between the catches of the first coupling part and the catches of the second coupling part.

27 Claims, 7 Drawing Sheets

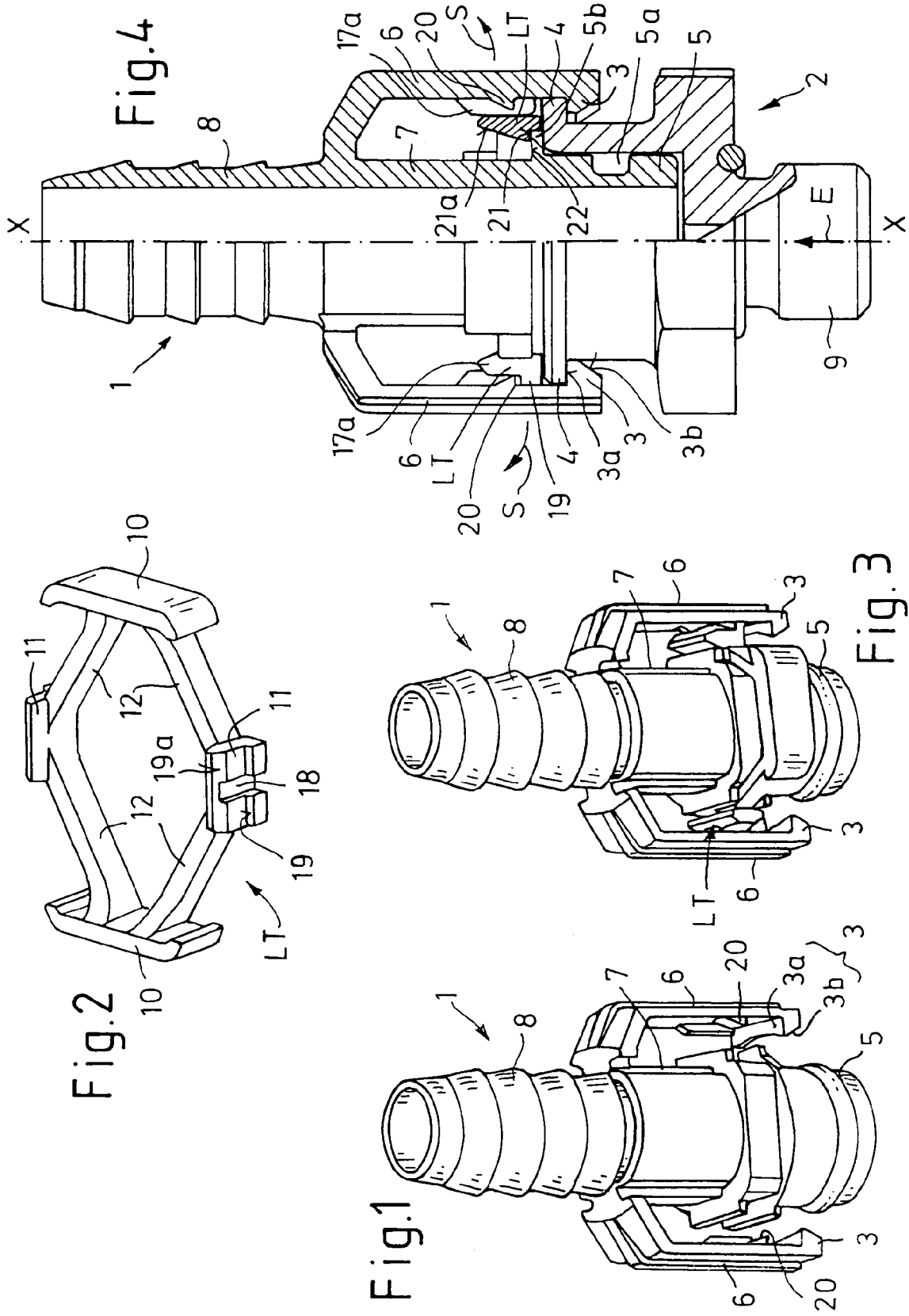

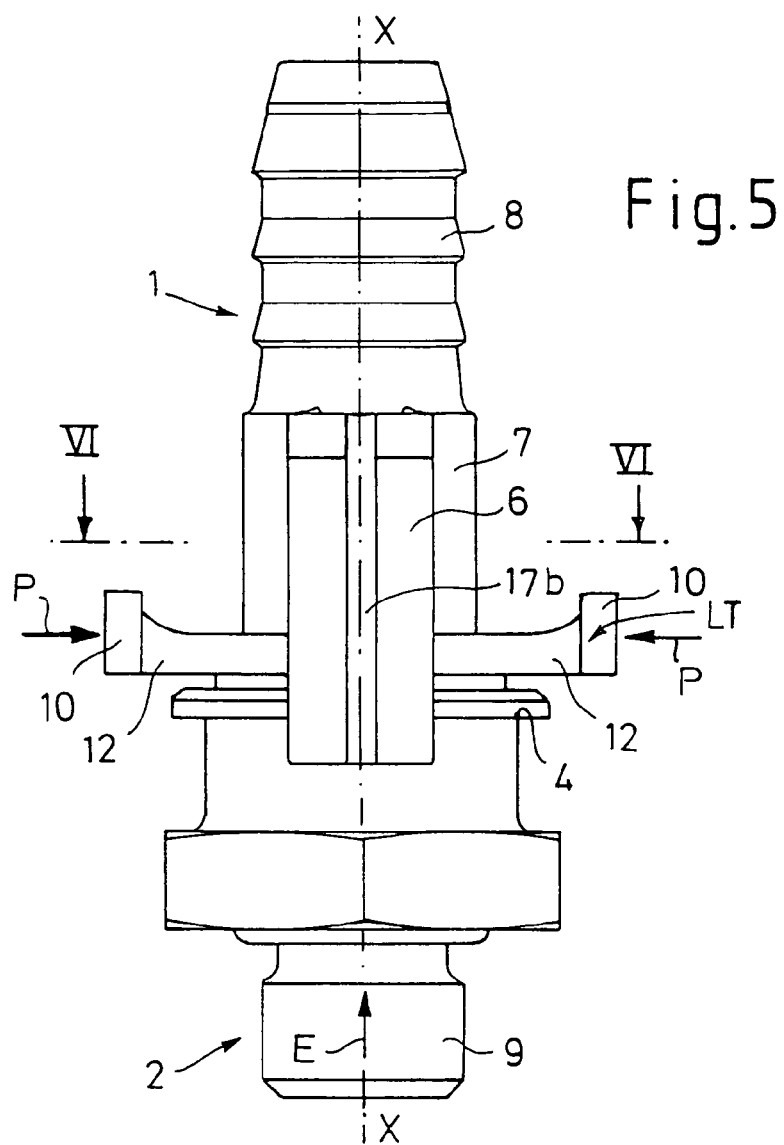
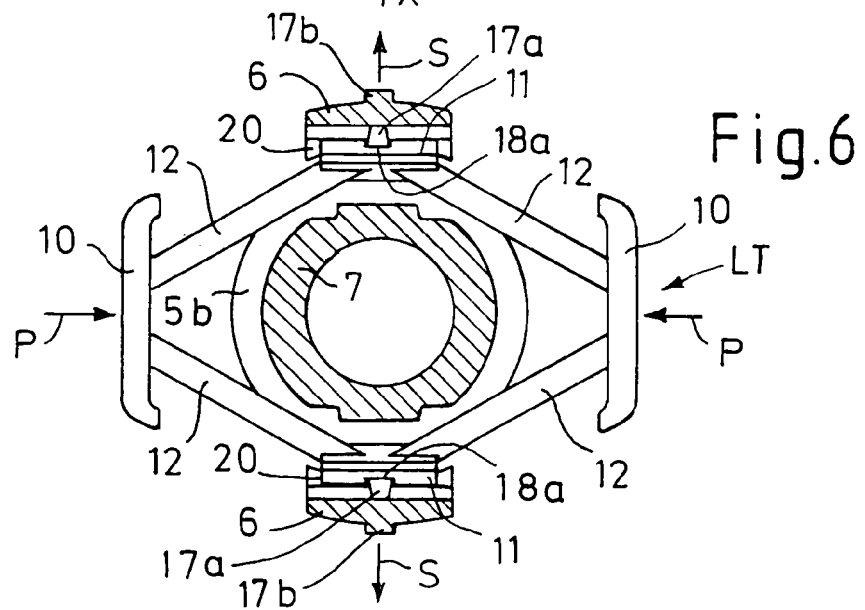

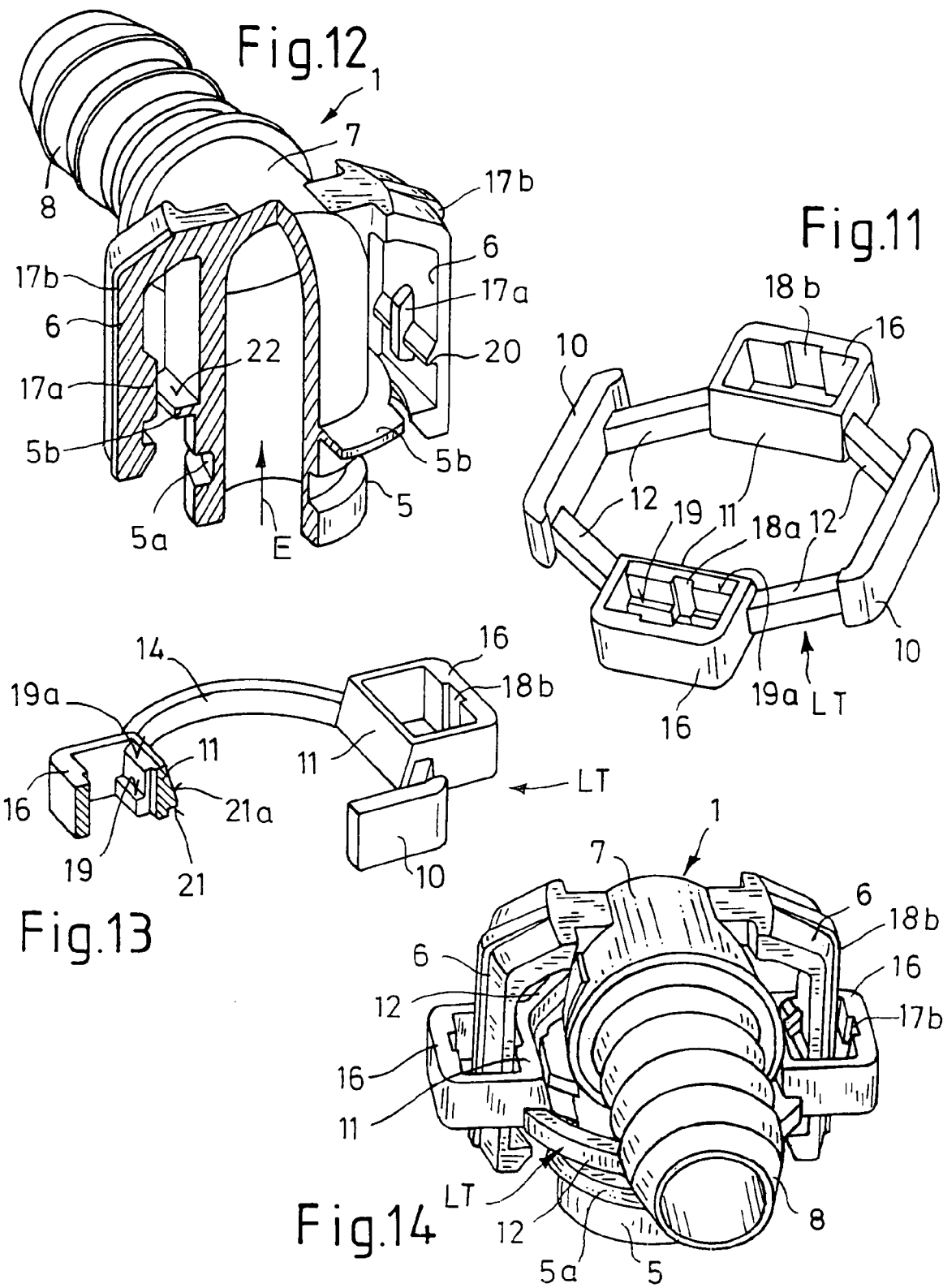

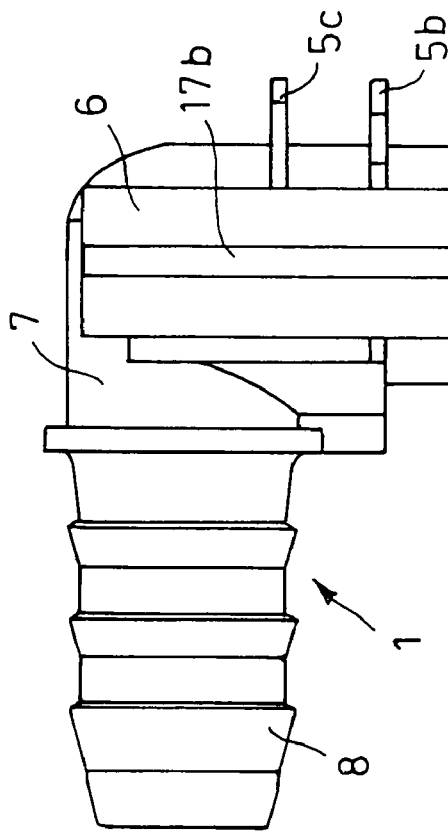
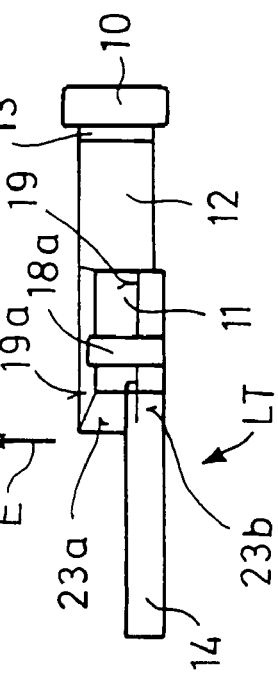
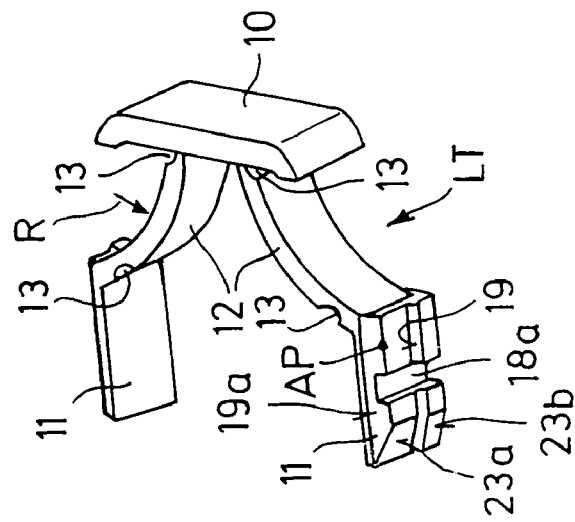

PLUG-IN COUPLING FOR FLUID SYSTEMS

BACKGROUND OF THE INVENTION

The present invention relates to a plug-in coupling for fluid systems, having two coupling parts connectable to one another, which have coordinated catches for connection with each other. One of the coupling parts has an end union section, by means of which it can be plugged into the other coupling part, and one of the coupling parts has at least one end retaining section carrying its catches, by means of which section it grips over an outer peripheral contour of the other coupling part, on which the coordinated complementary catches are formed.

Such a coupling is described in DE 38 43 995 C1, which desired a quick-fit connector for the connection or attachment of a hose or pipe. The known connecting arrangement has a housing part (first coupling part) and a core part (second coupling part), which can each be firmly connected at one end to a hose, pipe or appliance. A seal is arranged between the core part and the housing part. In the housing part, on the one hand, a union is formed for engagement in the core part, the outside diameter thereof being slightly smaller than the open inside diameter of the core part. On the other hand, an inside diameter of a socket-like section (retaining section) of the housing part is larger than the outside diameter of the core part. At the free end of the inside wall of the socket-like section of the housing part at least two diametrically opposing cams are formed with contact faces directed towards the free end and stop faces opposite these. Each stop face runs perpendicular, or inclined, in the form of an undercut to the longitudinal axis of the housing part. The clear distance between the cams is approximately equal to the outside diameter of the core part. The housing part is composed of an elastic material, the cams being formed on a ring provided with two legs. The cams thus formed constitute catches for locking the housing part to the core part. A ring with a contact face directed towards the free end of the core part and with a stop face opposite this, which runs perpendicular or inclined in the form of an undercut to the longitudinal axis of the core part and is formed on the outside of the core part. The ring thus formed constitutes a catch, designed to complement the cams, for locking the core part to the housing part. Among the advantages of this known quick-fit connector is that it comprises only two parts with associated sealing rings and does not contain any additional parts which require assembling and which can be lost. After joining the parts of the quick-fit connector together, it is possible to turn these parts in relation to one another, although for certain applications this cannot be regarded as advantageous. In order to release the connection, a fork with tapered prongs can be inserted between the legs on the housing part and the ring on the core part so that the legs are pressed radially outward, with the result in turn that the cams are raised over the outside diameter of the ring on the core part, so that the two coupling parts can be detached from one another by pulling them apart. The need to use such a special tool likewise cannot be regarded as advantageous for many applications. However, the direct locking of the two coupling parts to be joined together does constitute an advantage in ensuring a secure and stable connection.

A similar quick-fit connector to that described above is also disclosed by the German utility model DE 87 11 334 U1. This known quick-fit connector also has a core part and housing part which can each be firmly connected at one end to a hose, pipe or appliance, a sealing ring being arranged between the core part and the housing part. Similarly, a ring with a contact face directed towards the free end and with a stop face opposite this is formed on the outside of the core part, the inside diameter of the housing part being greater than the outside diameter of the core part, at least two diametrically opposing cams with contact faces directed towards the free end and stop faces opposite these are formed on the free end of the inside wall of the housing part, the clear distance between the cams is approximately equal to the outside diameter of the core part, and the housing part is composed of an elastic material. In contrast to DE 38 43 995 C1, however, the housing part does not have an inner union for engagement in the core part. The housing may be of elliptical or oval shape in the area of the cams, the cams being arranged on the minor axis of the ellipse. The cams can thereby be made to lift from the catch position by compressing the elliptical or oval housing in the direction of the major axis of the ellipse in order to release the connection. Here too, the fact that the quick-fit connector comprises only two parts with associated sealing rings is cited as one of the advantages of the quick-fit connector since a quick-connect coupling using an additional locking part, which might get lost, as is described in DE 31 43 015 A1, would not lend itself to automated assembly. The fact that external pressure applied to the housing can in itself lead to accidental detachment of the joined parts is, however, to be seen as a disadvantage.

A similar plug-in connector to that mentioned in DE 31 43 015 A1 that is a technical solution with a separate retaining part and without a direct locking of the first and second coupling parts, is also described in DE 43 00 037 C1. The detachable plug-in connector disclosed in this specification serves to accommodate a tubular plug-in part (first coupling part) having a peripheral retaining rib. The plug-in connector in this case comprises a cylindrical socket housing (second coupling part) with a central socket chamber for the insertion of the plug-in part, and a separate spring element made from hard elastic plastics which is provided with inwardly curving, flexibly expandable retaining edges for gripping behind the retaining rib once the plug-in part has been pressed in. In order to assemble this before the plug-in part can be inserted, the spring element must be compressed and introduced through a lateral opening in the socket housing into the socket chamber. Once the spring element has re-expanded in the socket chamber, especially in the closed position, the retaining edges are axially fixed by way of guide elements which are sunk in recesses situated in the outer wall. On the insertion side for the plug-in part, the retaining edges have contact faces converging obliquely in the insertion direction, by means of which they are forced further apart on insertion of the plug-in part. In order to release the connection between the retaining edges of the spring element and the retaining rib of the plug-in part again, i.e. in order to be able to press the retaining edges radially slightly away from the retaining rib, the retaining edges at their ends are interconnected by way of spring ribs converging in a V-shape, the joints in each case being arranged in the area of an opening in the socket housing, it being possible to press these joints inwards inward by means of curved pressure tabs.

SUMMARY OF THE INVENTION

The object of the present invention is to create a plug-in coupling for fluid systems of the aforementioned type, that is to say in particular one with a direct locking of a first and a second coupling part, which whilst ensuring ease of assembly and a highly stable connection is distinguished by its simplified means of detachment.

According to the invention, this is achieved by a separate release part which, in the assembled state, is secured to the first coupling part and/or the second coupling part, and which serves for separation of the locking connection between the catches of the first coupling part and the catches of the second coupling part.

The release part proposed according to the invention advantageously constitutes a "built-in release tool" for the plug-in coupling, which can be integrated into the coupling connection without it assuming the function of a connecting, retaining or arresting part. Only the mutually complementary catches of the first coupling part and the second coupling part, which ensure a secure and stable connection, serve for connecting the coupling parts together. One advantage of the separate release part is that the material from which it is made can be matched not to the material of the first coupling part, but also to that of the second coupling part, making it possible to purposely optimize the forces required to release the connection between the catches.

Although various embodiments of the retaining section are possible, for example in the form of a socket-like cylinder with longitudinally slotted side faces, one embodiment in which the retaining section of the first coupling part carrying catches is formed from two diametrically opposing, resiliently expandable retaining arms, constitutes a preferred variant of the invention owing to its ease of assembly. Operating the release part expands the retaining arms, thereby releasing the locking connection between the first and the second coupling part. The parts can be pulled apart, the retaining arms then returning automatically. In this case the spring and release forces (expanded position of the retaining arms) can be optimized by selecting different materials for the retaining arms.

The release part may be made of plastics or metal, it being particularly advantageous, with a view to ease of manufacture and a high degree of functionality, to manufacture the release part in one piece, for example as an injection molding. The release part may advantageously be composed, at least in sections, of a flexibly resilient material or having regard to manual adjusting forces and mechanical stresses commonly occurring in operation of a rigid material. At the same time different sections of the release part, such as rigid and/or flexible sections, may be connected together by way of hinges, such as film hinges.

At least one operating section for manual operation, opening sections, in particular for the expansion of the retaining arms, and pressure transmitting sections arranged between each operating and opening section are provided in the release part. The operating section in its basic design can, for preference, be substantially formed as a ring, the part or possibly also sections thereof then in its actual embodiment having a circular, oval or rectangular shape. These pressure-transmitting sections transmit the forces absorbed by the operating sections to the opening sections. At the same time the pressure transmitting sections may act either externally or centrally both on the operating sections and on the opening sections. In principle, a reduction in the operating and adjusting forces can also advantageously be achieved by fitting articulations, preferably in the form of film hinges, to the ends of the pressure transmitting sections. This allows the pressure transmitting sections to align better with the direction of the force flux.

With regard to the opening sections, correspondingly designed guide means may be provided on these sections and on the first coupling part in order that the opening sections only move radially outward when the operating sections are actuated.

One or two operating sections may preferably be provided on the release part. A release part having one operating section can appropriately be used in places where the first coupling part, due to the overall space or the plug shape, is only accessible from one side. According to a special embodiment of the invention, the release part may also comprise an operating section and two opening sections, each arranged between the operating section and a pressure transmitting section and, optionally, a connecting section linking the opening sections to one another. The release part may also have a substantially fork-shaped basic design (without a connecting section).

A release part having two operating sections should be used wherever there is no necessity, for the aforementioned reasons, to use a part having just one operating section. In particular, two diametrically opposed operating sections have the advantage of symmetry, making the release part easier to assemble automatically and optimizing the action of forces.

The outstanding feature of the release part proposed according to the invention is its ease of assembly. In principle, it merely needs to be inserted axially into an intermediate space between the union section and the retaining section of the first coupling part carrying the catch. In order to fix the release part even more securely to the first coupling part, however, appropriately designed catches may be provided on these two parts, particularly on the opening sections and on the retaining arms.

A possible variant of the invention is also described in detail below in which the release part and the first coupling part have catch and retaining elements so that the release part is assembled in the following order:

1. the release part is inserted axially into the first coupling part and/or locked to secure it against any axial return movement and 2. the release part is displaced tangentially in the first coupling part and locked to secure it against a corresponding return movement.

Further advantageous design features of the invention are contained in the dependent clauses and in the following description.

BRIEF DESCRIPTION OF THE DRAWINGS

The invention will be explained in more detail below with reference to a number of preferred examples of embodiments. In the drawings:

FIG. 1 shows a perspective view of a first coupling part of a plug-in coupling according to the invention, FIG. 2 shows a perspective view of a release part of a plug-in coupling according to the invention, FIG. 3 is a view corresponding to FIG. 1 showing the plug-in coupling according to the invention with the release part and the first coupling part in a pre-assembled state, FIG. 4 shows an axial half-section through an enlarged representation of the plug-in coupling according to the invention in FIG. 3, with first and second coupling parts and the release part in the (final) assembled state, FIG. 5 shows a side view of the plug-in coupling according to the invention with reference to FIG. 3, FIG. 6 shows a section through the plug-in coupling according to the invention along the line VI-VI in FIG. 5, FIGS. 7-11 show representations similar to FIG. 2 showing multiple embodiments of release parts of a plug-in coupling according to the invention, FIG. 12 shows a perspective, partially sectional view of a first coupling part of a further embodiment of a plug-in coupling according to the invention, FIG. 13 shows a perspective, partially sectional view of the release part, shown in FIG. 11, for a plug-in coupling according to the invention, FIG. 14 shows a perspective view of the first coupling part of a plug-in coupling according to the invention as shown in FIG. 12, assembled with the release part shown in FIG. 13, FIGS. 15 and 16 show representations similar to FIG. 2 showing two further embodiments of release parts of a plug-in coupling according to the invention, FIGS. 17-19 show a side view of a different assembly stage for a release part of a plug-in coupling according to the invention in a first coupling part.

In the various figures of the drawing, identical parts are provided with the same reference numerals and in the following are therefore, as a rule, each only described once.

DETAILED DESCRIPTION OF THE INVENTION

Figure 7:
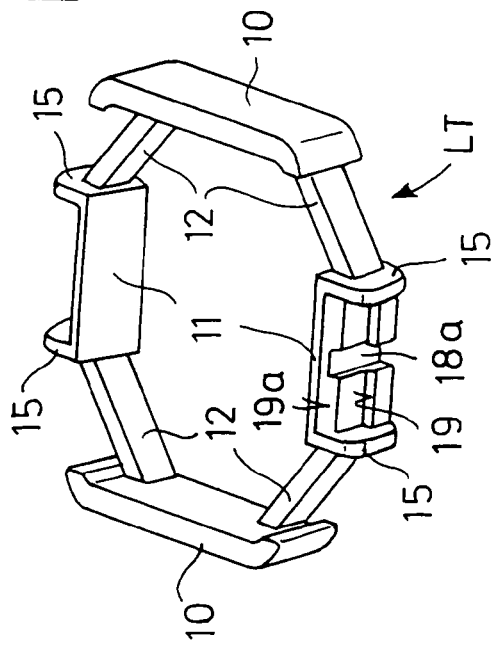

As will first be seen from FIGS. 1 to 4, a plug-in coupling for fluid systems according to the invention, in particular a quick connect coupling, comprises two tubular interconnectable coupling parts 1, 2, having catches 3, 4 to connect the respective parts 1, 2 together.

The first coupling part 1 (shown separately in FIG. 1) has an end union section 5 by means of which it can be plugged into the second coupling part 2 as shown in FIG. 4 (and also in two further main views in FIGS. 5 and 6). The first coupling part 1 also has at least one end retaining section 6 which supports its catches 3 and is formed in all the embodiments described below by two diametrically opposing retaining arms. The catches 3 of the first coupling part 1 grip over an outer peripheral contour of the second coupling part 2 on which catches 4, designed to complement the catches 3 of the first coupling part 1, are formed.

The catches 3 of the first coupling part 1 are each formed by a catch edge 3a, which is arranged in front of a butting face 3b, in the insertion direction of the second coupling part 2 (arrow E in FIGS. 4, 5, 12 and 17) in a manner known in the art (cf. FIGS. 1 and 4). The complementary catches 4 of the second coupling part 2 are formed from an annular peripheral flange section, arranged in particular at the end (cf. FIGS. 4 and 5). (The reference numeral 4 is hereinafter used both for "catches" and for "flange section", since in the following only embodiments of catches formed from a flange section are actually described).

The plug-in coupling according to the invention furthermore comprises a separate release part LT (shown separately in FIG. 2), which in the assembled state (FIG. 4) or even in a pre-assembled state (FIG. 3), is coupled with the first coupling part 1 and/or the second coupling part 2 and serves for separating the locking connection between the catches 3 of the first coupling part 1 and the catches 4 of the second coupling part 2.

As already stated, in a preferred embodiment the retaining section 6, carrying the catches 3 of the first coupling part, may be formed from two diametrically opposing, flexibly resilient and expandable retaining arms. (The reference numeral 6 is hereinafter used both for "retaining section" and for "retaining arms", since in the following only embodiments of the retaining section formed from retaining arms are actually described). The possible expansion movement of the retaining arms 6 for releasing the first coupling part 1 from the second coupling part 2 is indicated by the arrows labeled S in FIG. 4.

The retaining arms 6 are integrally formed onto a tube length 7 of the first coupling part 1 on which a line connection 8 is formed at one end and the union section 5 at the other end. The line connection 8 and the union section 5 are coaxial (insertion axis X-X in FIG. 4), i.e. they align with one another.

As FIG. 4 illustrates, the union section 5 has a peripheral groove 5a to accommodate a seal, such as an O-ring. It can also be seen from FIG. 4 that the union section 5 also has a peripherally arranged stop 5b, interacting in particular with the flange section 4 of the second coupling part 2 in order to limit the depth of insertion into the second coupling part 2.

Figure 9:
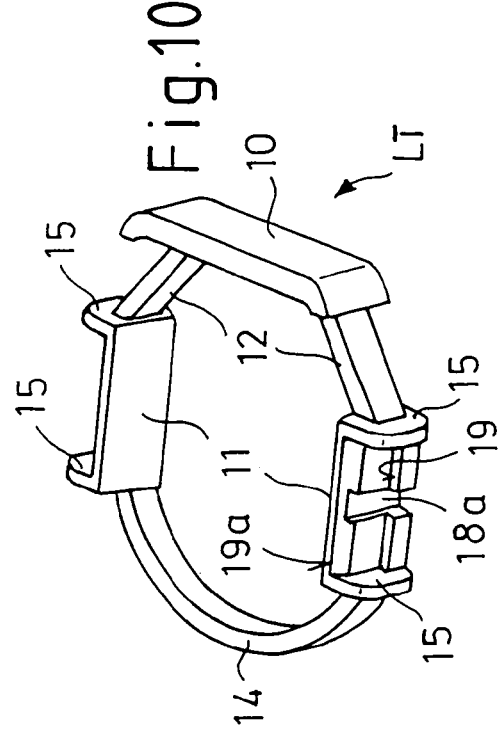

Like the first coupling part 1, the second coupling part 2 also has a line connection 9 (FIGS. 4, 9) at one end. In particular, the line connection is on the side remote from the flange section 4.

The release part LT proposed according to the invention can be easily fitted or pre-fitted in the first coupling part 1. For this purpose, it is merely pushed axially in the insertion direction of the second coupling part (arrow E in FIGS. 4, 12) into an intermediate space (not further identified) between the union section 5 and the retaining section 6, carrying the catches 3, of the first coupling part 1. The two coupling parts 1, 2 can then be inserted into one another and locked together.

In all embodiments the release part LT has at least one operating section 10. As shown in FIG. 2, it preferably has two opposing tab-like operating sections 10. FIG. 2 furthermore shows that the release part LT has at least two opening sections 11, preferably two opposing, especially tab-like opening sections 11 for bearing against a radially inner face of the retaining arms 6 and for radially expanding the retaining arms 6. Finally, it can be seen from FIG. 2 that the release part LT has at least two pressure transmitting sections 12, preferably four, especially bar-like pressure transmitting sections 12, which each attach centrally to the operating sections 10 and the opening sections 11. In each case, a pressure transmitting section 12 joins an operating section 10 to an opening section 11. In its basic design, therefore, the release part LT is designed essentially as a ring. This design also encompasses the fact that the release part LT, or sections thereof, may have a circular, oval or rectangular shape.

To release the plug-in coupling according to the invention from the assembled state shown in FIGS. 4 to 6, a manual pressure is applied to the operating sections 10 in the direction of the arrows P in FIGS. 5 and 6. This pressure is transmitted via the pressure transmitting sections 12 to the opening sections 11. As can be clearly seen, in particular, from FIG. 6, these bear on the retaining arms 6 and under the effect of the pressure perform an expansion movement, also lead to an expansion (arrows S) of the retaining arms 6. The catch elements 3, 4 of the first coupling part 1 and the second coupling part 2 are thereby disengaged and the two coupling parts 1, 2 can be separated from one another, for example by pulling the second coupling part 2 off from the first coupling part 1 in a direction opposite of the arrow E.

The release part LT may be composed of a plastic or a metal material. With a view to an advantageously automatic return from the expanded position once the operating force is withdrawn, the release part LT is preferably composed, wholly or in some sections, of a flexibly resilient material. It is equally possible, however, for the release part LT to be composed, especially in sections, of a rigid material.

It may be necessary or advantageous, particularly where different materials are used in the various sections of the release part LT, but also where it is made from one single material, for different sections in the release part LT, for example rigid and/or flexible sections, such as pressure transmitting sections 12, operating section(s) 10 or opening sections 11, to be linked together by way of hinges, such as film hinges. Such film hinges are shown in the embodiments of the release part LT according to FIG. 7 and FIGS. 15 to 19, where they are in each case denoted by the reference numeral 13. The film hinges 13 reduce the operating forces that need to be applied and allow the pressure transmitting sections 12 to align better with the direction of the force flux.

In the embodiments according to the figures, the pressure transmitting sections 12 of the release part LT each have a concave curvature. This also serves to optimize the force flux. The pressure transmitting sections 12, curved inwardly to the insertion axis X-X, mean that the forces diminish towards the deflection (bending point) of the pressure transmitting sections 12 and, when actuated on the first coupling part 1, the pressure transmitting sections 12 resting on this part slide off effectively.

Figure 8:
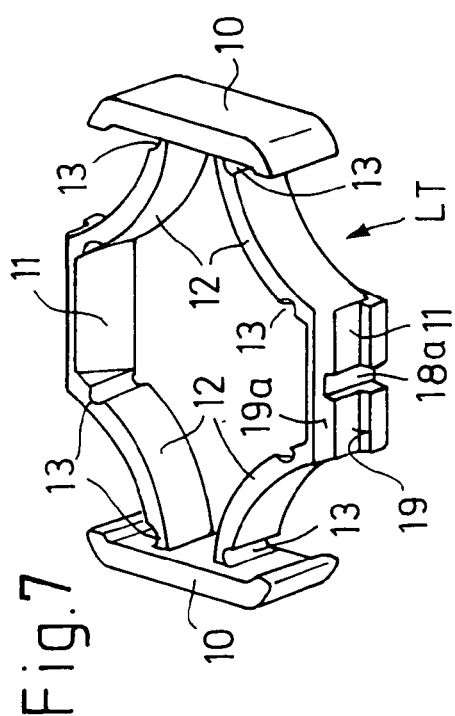
Figure 10:
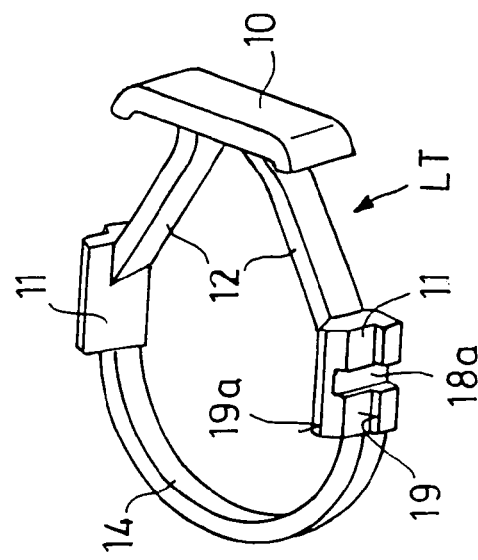

FIG. 8 shows an embodiment of the release part LT which comprises an operating section 10, two opening sections each arranged between the operating section 10 and a pressure transmitting section 12, and a connecting section 14 joining the opening sections 11 together. Further such embodiments are also shown in FIGS. 10 and 13 and in FIGS. 16 to 19. The connecting section 14 "replaces" an operating section 10 so that the release part LT in the embodiments only has one operating section 10. It has already been mentioned with regard to this that a release part LT with one operating section 10 can be appropriately used where the overall dimensions and the shape of the first coupling part 1 should make this necessary.

A particular feature of the embodiments according to FIGS. 9 to 11 and FIGS. 13 and 14 is that in the possible variants of the invention shown, the opening sections 11 of the release part LT each have reinforcing elements 15, 16. These reinforcing elements 15, 16 relate firstly to ribs 15 projecting at right angles which in addition to their reinforcement function can also assume a guide function, (FIGS. 9, 10), and secondly to annular attachments 16 (FIGS. 11, 13) that grip around the retaining arms 6 in the assembled or pre-assembled state (FIG. 14). The attachments protect the retaining arms 6, and when pressure is applied to the first coupling part 1 in the inserted state, provide additional reinforcement for the latter.

FIGS. 12 and 14 and FIGS. 17 to 19 show embodiments of the first coupling part 1 in which, in contrast to FIG. 1 and FIGS. 3 to 6, the line connection 8 and the union section 5 are arranged at an angle to one another, in particular at a right angle. From these figures it will be clear that the use of the release part LT proposed according to the invention is not confined to a specific design of the first coupling part 1, but that it can be used in a wide variety of design forms, in particular with an embodiment of the retaining section 6 as retaining arms 6. Thus, the release part LT proposed according to the invention may also be combined with a plug-in coupling arrangement in which the retaining section 6 is situated on the second coupling part 2 and the catch, such as the flange section 4 on the first coupling part 1.

The use of a release part LT having only one operating section 10 proves particularly appropriate for curved embodiments of the first coupling part. In this case, it is also possible for the release part LT to depart in its basic design from a closed annular shape and to be designed essentially with a forked shape, as shown in FIG. 15. The absence of a second operating section 10 and of a connecting section 14 reduces not only the rigidity of the release part LT, but also the operating force required.

One feature of the plug-in coupling according to the invention, hitherto not mentioned but important because it is advantageous, which is also shown in all figures representing embodiments of the invention, is that positively interlocking guide elements 17a, 18a, 17b, 18b, are arranged on the release part LT. In particular on its opening sections 11, on the one hand, and on the retaining section 6 of the first coupling part 1, and in particular the retaining arms 6, on the other. Guide ribs 17a, 17b are arranged on the first coupling part 1 (see FIGS. 4, 6, 14 and 16) and guide slots 18a, 18b on the release part LT (see FIGS. 2, 4, 6, 7 to 11, 13 to 17).

The guide slots 18a may be located primarily in the radially outer face of the opening sections 11, which comes to bear on the retaining arms 6, the corresponding guide ribs 17a then being located on the complementary radially inner bearing face of the retaining arms 6.

Should the opening sections 11, as described above, have reinforcing elements in the form of annular attachments 16 gripping around the retaining arms 6, it is also possible for each of the guide slots 18b to be located in the radially inner face of the annular attachments 16, which comes to bear on the retaining arms 6. The corresponding guide slots 17b then in turn are located on the complementary radially inner bearing face of the retaining arms 6.

The guide elements 17a, 17b, 18a, 18b arranged parallel to the insertion axis X-X advantageously ensure that when the operating sections 10 are actuated (arrow P), the opening sections 11 can only move radially outward (arrow S) and cannot be displaced tangentially. The guide elements 17a, 17b, 18a, 18b are thereby also designed in such a way that they prevent any rotation of the release part LT and first coupling part 1 relative to one another, but will permit a relative displacement running parallel to the insertion axis X-X.

Figure 19:
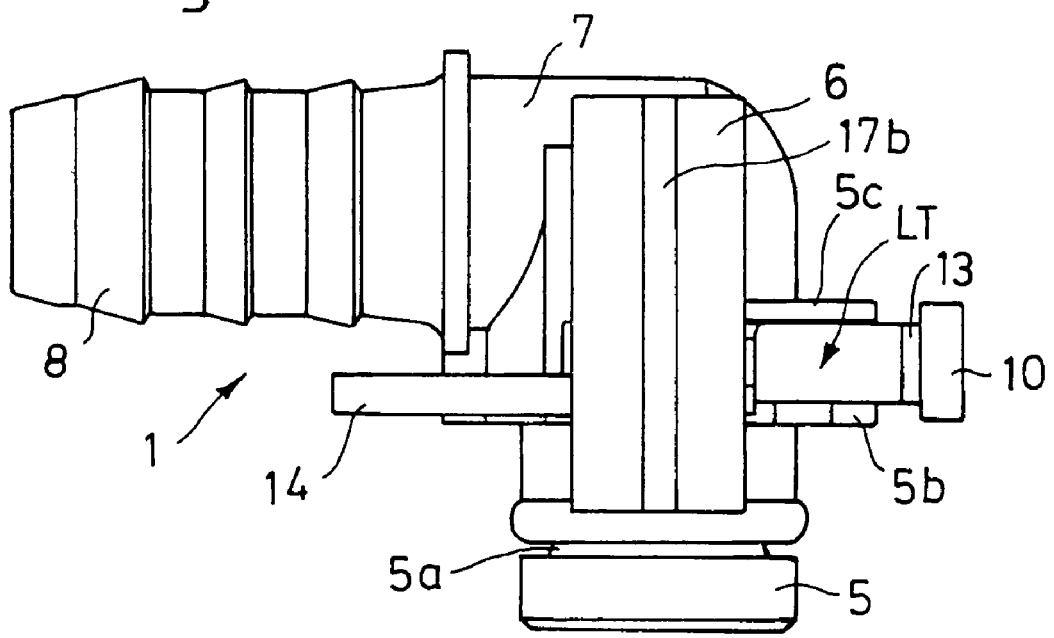

All embodiments of the invention represented in the figures also show a detail of how the separate release LT can be held on the first coupling part 1 even in the pre-assembled state (FIGS. 3, 14, 19). This detail resides in the fact that complementary coordinated stops 19, 20, in particular bearing edges 19 of the release part LT (FIGS. 2, 4, 7 to 11, 13 and 15 to 17) and bearing edges 20 of the first coupling part 1 (FIGS. 1, 4 and 12), opposing one another in the assembled or pre-assembled state, are arranged on the release part LT on the one hand, in particular on the radially outer side of the opening sections 11 thereof, and on the other hand on the retaining section 6, in particular on the radially inner side of the retaining arms 6 of the first coupling part 1. These edges 19, 20 prevent the release part LT from being inserted too far (in the direction E) into the first coupling part 1 (movement limit). In order to facilitate the insertion of the release part LT into the desired position in the insertion direction E, however, an inclined face 19a serving as a butting face may advantageously in each case be arranged in front of the respective bearing edge 19 of the release part LT, as can likewise be seen from the representations of the release part LT.

FIG. 4 (right-hand side) furthermore shows an advantageous facility for securely retaining the separate release part LT on the first coupling part 1 even in the pre-assembled state. With this facility complementary coordinated, catch elements 21, 22, in particular catch edges 21 of the release part LT (see also FIG. 13) and catch edges 22 of the first coupling part 1 (see also FIG. 12), gripping behind one another in the assembled or pre-assembled state, are arranged on the release part LT on the one hand, in particular on the radially inner side of the opening sections 11 thereof, and on the other hand on the retaining section 6, in particular on the radially outer side of the retaining arms 6 of the first coupling part 1.

The catch edge 22 of the first coupling part 1 may advantageously be formed by the end face, its surface pointing in the insertion direction E, of the stop 5b peripherally arranged on the union section 5, in order to limit the insertion depth of the first coupling part 1 into the second coupling part 2. Once activated, these catch elements 21, 22 prevent any axially parallel backwards displacement (counter to direction E) of the release part LT in relation to the first coupling part 1. As in the case of the catch elements 3 of the first coupling part 1 for locking this to the second coupling part 2, an inclined face 21a serving as a butting face may advantageously be arranged in front of each catch edge 21 of the release part LT, as can likewise be seen from the representations of the release part LT in FIGS. 4 and 13.

Figure 18:
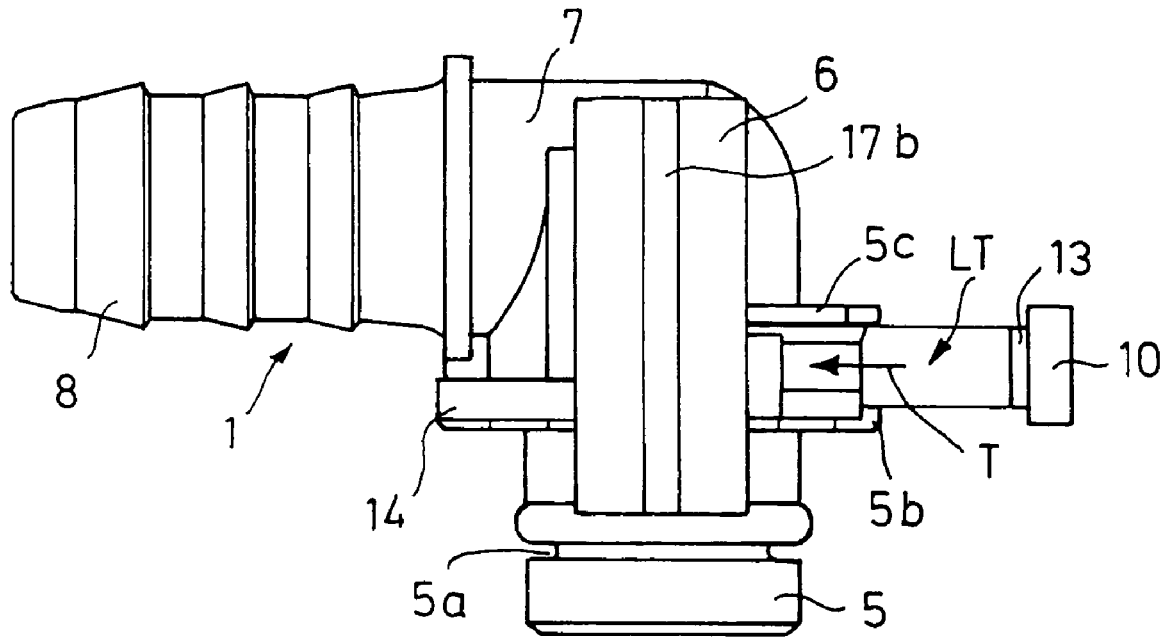

Finally, the release part LT and the first coupling part 1 of the plug-in coupling according to the invention can, as illustrated by FIGS. 17 to 19, be locked to one another in numerous ways, or secured to prevent their relative movement in a number of directions. This can be done firstly in an initial pre-assembly stage from the position shown in FIG. 17 through an axial insertion of the release part LT into the first coupling part 1 in the direction of the arrow E in FIG. 17. This again also indicates the insertion direction of the second coupling part, and then, where necessary, by locking to prevent any axial backwards movement of the release part LT. The release part LT then assumes the position shown in FIG. 18. The first step is followed by a second pre-assembly step that consists in a tangential displacement of the release part LT in the first coupling part 1 (arrow T in FIG. 18) and brings about a locking, which secures the release part LT against a reverse (backward) movement. This state is shown FIG. 19. Guides (stop 5b, guide stop 5c in FIGS. 17 to 19) for the tangential displacement T of the release part LT can be provided on the first coupling part 1.

The embodiments shown in FIGS. 15 and 16 are particularly suitable as release part LT for this method of pre-assembly. Complementary coordinated catch elements on the two coupling parts 1, 2, which are formed in the manner of the catch edges 21, 22, previously described and running perpendicular to the insertion axis X-X, are suitable for the axial locking. For the tangential locking, catch elements arranged parallel to the insertion axis X-X, especially in the manner of the guide elements 17a, 18a previously described, may be used. Corresponding butting faces 23a, 23b running obliquely to the tangential insertion direction T, again are being arranged, in particular, in front of the catch elements of the release part LT. In the absence of a connecting section 14 the release part LT may also assembled and locked together with the coupling parts 1, 2 simply by a tangential displacement (arrow T in FIG. 18).

Figure 20:
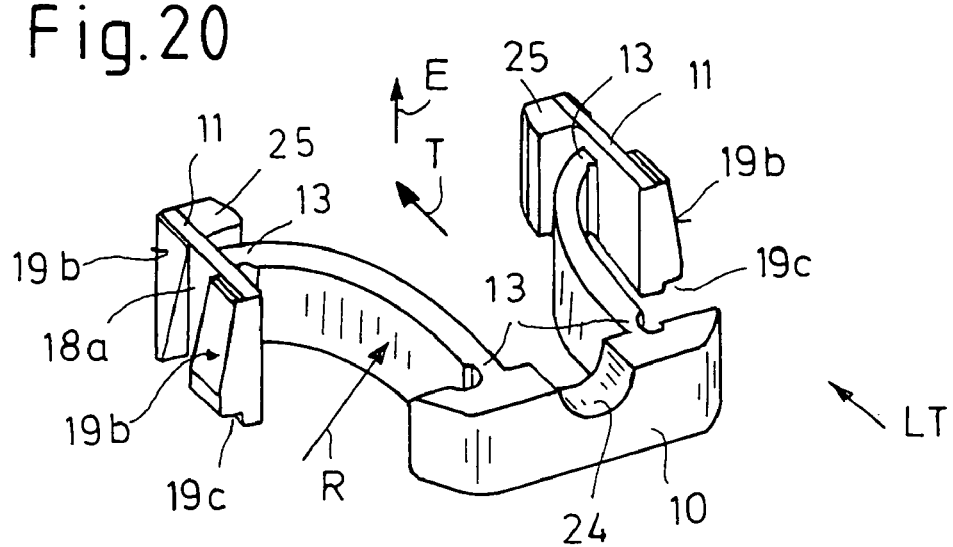
FIGS. 20-22 show various views of a further embodiment of a release part of a plug-in coupling according to the invention.
Figure 21:
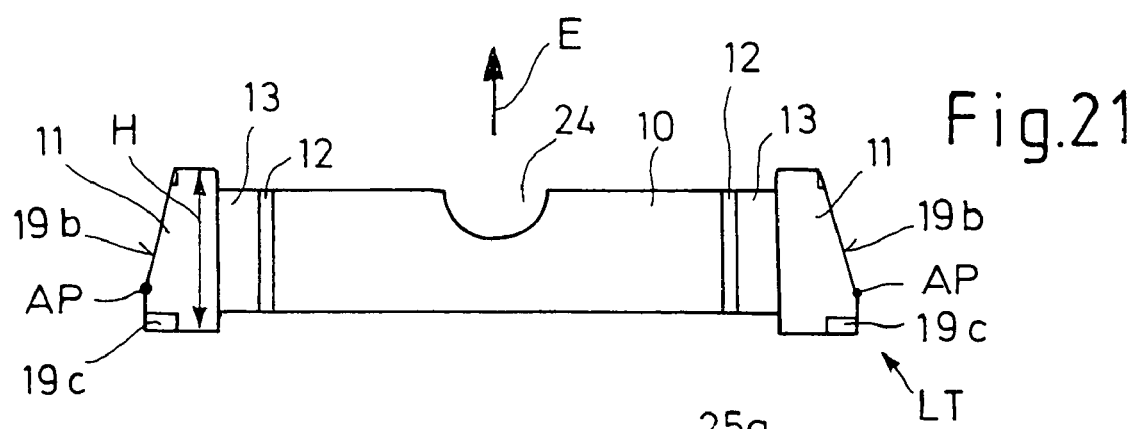
Figure 22:
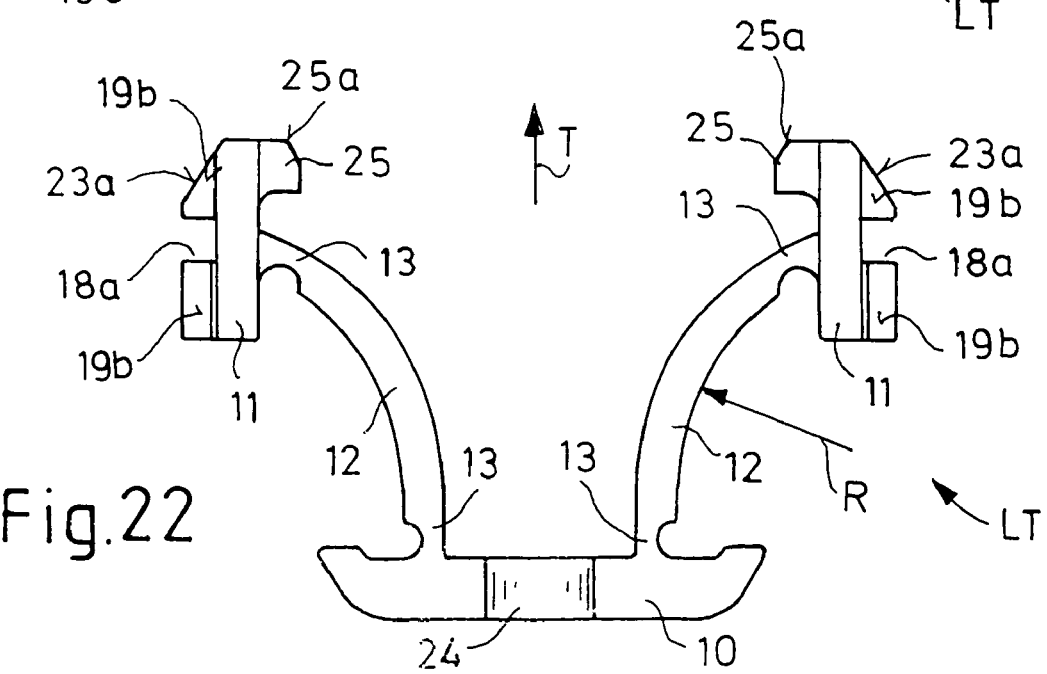

In its basic construction, the further embodiment of a release part LT for a plug-in coupling according to the invention as shown in FIG. 20 to 22, (in a perspective view in FIGS. 20, a front view in FIG. 21 and a top view in FIG. 22), corresponds to the embodiment according to FIG. 15. In a departure from the above embodiment, a centrally arranged notch 24, particularly one of hemispherical cross-section, which in fully automated assembly serves as a locating indicator for the release part LT, is additionally formed in the operating section 10 of the release part LT. In addition, the pressure transmitting section 12, in contrast to the embodiment according to FIG. 15, acts by way of the film hinge 13 not on the end but approximately centrally on the inside of the opening section 11. When releasing, this serves to distribute the force more uniformly and the inwardly curved pressure transmitting section 12 can be formed with a relatively larger radius of curvature R, advantageously resulting in a larger lever arm and a greater potential expansion when releasing. On the inside of its opening section 11, the release part LT has a guide projection 25 with an inlet bevel 25a (FIG. 22), which in the radial or axial assembly interacts with the union section 5 of the first coupling part 1, and serves for self-centering of the release part LT in the first coupling part 1, in this case the plug.

As in the embodiment according to FIG. 15, an inclined face 23a, shown in the top view of the release part LT in FIG. 22, is situated in front of the radially outer guide slot 18a of the respective opening section 11 of the release part LT. These bilaterally and symmetrically formed inclined faces 23a converge in the tangential insertion direction T of the release part LT and serve, as already explained, as butting faces. In addition, the opening section 11 of the release part LT in the embodiment shown has a further inclined face 19b, as is illustrated in particular by the front view according to FIG. 21. In its function and in its course, converging in the insertion direction E of the second coupling part 2, this additional face corresponds to the inclined face 19a in the embodiment according to FIG. 15. In contrast to the inclined face 19a in the embodiment according to FIG. 15, however, the inclined face 19b, apart from the interruption by the guide slot 18a, also present in that in FIG. 15, extends virtually over the entire height H of the outside of the opening section 11, a recess 19c, which fulfills the same function as the bearing edge 19 in FIG. 15, nevertheless is situated in a remaining height section of the outside of the opening section 11 in a part thereof shown at the bottom of FIG. 21. In detail, the inclined face 19b extends over more than 85% of the height H of the outside of the opening section, whereas its extent in the embodiment according to FIG. 15 makes up no more than approximately 25% to 30%, as can be seen from the corresponding geometric proportions. The comparatively longer inclined face 19b means that when the release section 10 is operated in the insertion direction T, a force of the opening sections 11 acts on the retaining arms (retaining sections 6), and a bearing point AP is formed between the two parts which in comparison to the representations in FIG. 15 and FIG. 21, migrates downward in FIG. 21. This increases the length of a lever arm acting on the retaining arm, thereby advantageously reducing an operating force that has to be applied to the release part LT in order to release the connection.

The invention is not limited to the examples of embodiments shown but also encompasses all embodiments exercising essentially similar effects to those of the invention. In particular, the kinematic reversal (transposition of the arrangement) with regard to the formation of the union section 5 on one coupling part and the associated insertion opening on the other coupling part, that is to say the coupling part with union section 5 or the coupling part with insertion opening for the union section 5 may have the retaining section 6. The design of the corresponding catches 3, 4 then have to be modified accordingly.

It has moreover already been mentioned that the first coupling part 1 and the release part LT may be embodied in different forms. One coupling or both coupling parts 1, 2 may also be unilaterally connected or connectable directly to appliances without departing from the scope of the invention.

Nor is the invention limited to the combination of features defined in claim 1. Rather, it may also be defined by any other combination of specific features taken from all the individual features disclosed. This means that in principle, virtually any individual feature of claim 1 may be omitted or replaced by at least one individual feature disclosed elsewhere in the application. In this respect claim 1 is to be interpreted merely as an initial attempt at formulating an invention.

The invention claimed is:

1. A plug-in coupling for fluid systems, having two coupling parts connectable to one another, the coupling comprising: a first coupling part and a second coupling part, each of the coupling parts including respectively first and second interengaging catches for connecting the first and second coupling parts together, one of the first and second coupling parts including an end union section by means of which the one of the first and second coupling parts can be plugged into the other of the first and second coupling parts, the first coupling part further including at least one end retaining section having the first catches configured to form a connection by gripping a peripheral contour of the second coupling part which forms the second catches, a separate release part provided on at least one of the two coupling parts for separating the connection between the first catches of the first coupling part and the second catches of the second coupling part by means of outward radial resilient expansion movement of a first portion of the release part into an expanded position in response to inward radial resilient movement of a second portion of the release part under the effect of a manual pressure, the release part being held in a fixed axial position on the at least one of the two coupling parts during separating of the connection between the first and second catches and the release part including a flexibly resilient material effecting a return from the expanded position, if the manual pressure is withdrawn, wherein the release part has at least two opening sections forming the first portion, at least one operating section forming the second portion and at least two pressure transmitting sections, each of the pressure transmitting sections linking an opening section to the at least one operating section, so that the release part is generally fork shaped, and wherein the first catches are formed from two diametrically opposing resilient expandable retaining arms of the retaining section, which are integrally formed onto a tube length of the first coupling part.

2. The plug-in coupling according to claim 1, wherein the first catches are formed from two diametrically opposing, resiliently expandable retaining arms of the retaining section.

3. The plug-in coupling according to claim 2, wherein the retaining arms are integrally formed onto a tube length of the first coupling part, on which a line connection is formed at one end of the tube length and the union section at the other end of the tube length.

4. The plug-in coupling according to claim 3, wherein the line connection and the union section are generally aligned with one another.

5. The plug-in coupling according to claim 3, wherein the line connection and the union section are arranged at approximately a right angle to one another.

6. The plug-in coupling according to claim 1, wherein the first catches of the first coupling part are each formed by a first catch edge, in front of which a butting face is arranged, and the second catches of the second coupling part are formed from an annular peripheral flange section, arranged adjacent an end of the second coupling part.

7. The plug-in coupling according to claim 1, wherein the second coupling part has a line connection at one end thereof, on a side remote from the flange section.

8. The plug-in coupling according to claim 1, wherein the union section has a peripheral groove to accommodate an O-ring.

9. The plug-in coupling according to claim 1, wherein the union section has a peripherally arranged stop, interacting with the outer peripheral contour of the second coupling part, in order to limit a depth of insertion of the union section into the second coupling part.

10. The plug-in coupling according to claim 1, wherein the first portion of the release part has at least two tabs defining opening sections for bearing against a radially inner face of the retaining arms and for radially expanding the retaining arms.

11. The plug-in coupling according to claim 10, wherein the opening sections have reinforcing elements.

12. The plug-in coupling according to claim 11, wherein the reinforcing elements include ribs projecting at right angles from the opening sections.

13. The plug-in coupling according to claim 11, wherein the reinforcing elements include annular attachments that extend around the retaining arms.

14. The plug-in coupling according to claim 1, wherein the pressure transmitting sections attach centrally or externally to the opening sections.

15. The plug-in coupling according to claim 14, wherein the pressure transmitting sections have a concave curvature.

16. The plug-in coupling according to claim 1, wherein at least sections of the release part have a circular, oval or rectangular shape.

17. The plug-in coupling according to claim 1, wherein the release part includes a flexibly resilient material.

18. The plug-in coupling according to claim 1, wherein the release part includes a rigid material.

19. The plug-in coupling according to claim 1, wherein sections of the release part are connected together by way of film hinges.

20. The plug-in coupling according to claim 1, wherein positively interlocking guide elements are arranged on opening sections of the release part and on retaining arms of the first coupling part.

21. The plug-in coupling according to claim 20, wherein the guide elements are designed in such a way that they substantially prevent rotation of the release part and the first coupling part relative to one another but permit a relative axially parallel displacement in relation to one another.

22. The plug-in coupling according to claim 1, wherein catch edges of the first and second catches grip behind one another in the assembled state, together with bearing edges, which in the assembled state limit relative axially parallel displacement of the release part and first coupling part in relation to one another, are arranged on the release part, on the opening sections thereof, and on the retaining arms of the first coupling part.

23. The plug-in coupling according to claim 1, wherein catch edges of the first and second catches grip behind one another in the assembled state, in front of which at least one butting face is arranged rising counter to a tangential assembly direction on the opening sections of the release part and on retaining arms of the first coupling part, said butting face in the assembled state preventing relative tangential displacement of the release part and first coupling part in relation to one another.

24. The plug-in coupling according to claim 1, wherein the release part includes four bars defining the pressure transmitting sections.

25. A plug-in coupling for fluid systems, having two coupling parts connectable to one another, the coupling comprising: a first coupling part and a second coupling part, each of the coupling parts including respectively first and second interengaging catches for connecting the first and second coupling parts together, one of the first and second coupling parts including an end union section by means of which the one of the first and second coupling parts can be plugged into the other of the first and second coupling parts, the first coupling part further including at least one end retaining section having the first catches configured to form a connection by gripping a peripheral contour of the second coupling part which forms the second catches, a separate release part provided on at least one of the two coupling parts for separating the connection between the first catches of the first coupling part and the second catches of the second coupling part by means of outward radial expansion movement of a first portion of the release part into an expanded position in response to inward radial movement of a second portion of the release part under the effect of a manual pressure, the release part being held in a fixed axial position on the at least one of the two coupling parts during separating of the connection between the first and second catches and the release part including a flexibly resilient material effecting a return from the expanded position, if the manual pressure is withdrawn, wherein the release part has at least two opening sections forming the first portion, at least one operating section forming the second portion and at least two pressure transmitting sections, each of the pressure transmitting sections linking an opening section to the at least one operating section and a connecting section linking the opening sections to one another whereby the release part is generally formed as a ring, and wherein the first catches are formed from two diametrically opposing resilient expandable retaining arms of the retaining section, which are integrally formed onto a tube length of the first coupling part.

26. A plug-in coupling for fluid systems, having two coupling parts connectable to one another, the coupling comprising: a first coupling part and a second coupling part, each of the coupling parts including respectively first and second interengaging catches for connecting the first and second coupling parts together, one of the first and second coupling parts including an end union section by means of which the one of the first and second coupling parts can be plugged into the other of the first and second coupling parts, the first coupling part further including at least one end retaining section having the first catches configured to form a connection by gripping a peripheral contour of the second coupling part which forms the second catches, a separate release part provided on at least one of the two coupling parts for separating the connection between the first catches of the first coupling part and the second catches of the second coupling part by means of outward radial expansion movement of a first portion of the release part into an expanded position in response to inward radial movement of a second portion of the release part under the effect of a manual pressure, the release part being held in a fixed axial position on the at least one of the two coupling parts during separating of the connection between the first and second catches and the release part including a flexibly resilient material effecting a return from the expanded position, if the manual pressure is withdrawn, wherein the release part has at least two opening sections forming the first portion, has two operating sections forming the second portion or one operating section forming the second portion and one connecting section, and has at least two pressure transmitting sections, each of them linking an opening section to an operating section or to the connecting section, so that the release part is generally formed as a ring, and wherein the first catches are formed from two diametrically opposing resilient expandable retaining arms of the retaining section, which are integrally formed onto a tube length of the first coupling part.

27. A plug-in coupling for fluid systems, having two coupling parts connectable to one another, the coupling comprising: a first coupling part and a second coupling part, each of the coupling parts including respectively first and second interengaging catches for connecting the first and second coupling parts together, one of the first and second coupling parts including an end union section by means of which the one of the first and second coupling parts can be plugged into the other of the first and second coupling parts along an insertion axis, the first coupling part further including at least one end retaining section having the first catches configured to form a connection by gripping a peripheral contour of the second coupling part which forms the second catches, a separate release part provided on at least one of the two coupling parts for separating the connection between the first catches of the first coupling part and the second catches of the second coupling part by means of outward radial resilient expansion movement of a first portion of the release part into an expanded position in response to inward radial resilient movement of a second portion of the release part under the effect of a manual pressure, the release part being held in a fixed axial position on the at least one of the two coupling parts during separating of the connection between the first and second catches and the release part including a flexibly resilient material effecting a return from the expanded position, if the manual pressure is withdrawn, wherein the release part has at least two opening sections forming the first portion, at least one operating section forming the second portion and at least two pressure transmitting sections, which are curved inwardly to the insertion axis, each of them linking an opening section to the at least one operating section, so that the release part is generally fork shaped, and wherein the first catches are formed from two diametrically opposing resiliently expandable retaining arms of the retaining section, which are integrally formed onto a tube length of the first coupling part.

* * * * *